United States Patent [19]
Fox

[11] 3,722,996
[45] Mar. 27, 1973

[54] OPTICAL PATTERN GENERATOR OR REPEATING PROJECTOR OR THE LIKE

[75] Inventor: Wayne L. Fox, Castro Valley, Calif.

[73] Assignee: Electromask, Inc., Van Nuys, Calif.

[22] Filed: Jan. 4, 1971

[21] Appl. No.: 103,524

[52] U.S. Cl. ..........................355/53, 308/9, 355/54, 355/76
[51] Int. Cl. ............................................G03b 27/42
[58] Field of Search ..........355/54, 53, 45, 76; 308/9

[56] References Cited

UNITED STATES PATENTS

| | | | |
|---|---|---|---|
| 3,498,711 | 3/1970 | Ables et al. | 355/53 |
| 3,260,153 | 7/1966 | Abbot, Jr. et al. | 355/45 X |
| 3,103,850 | 9/1963 | Khoury et al. | 355/76 |

Primary Examiner—Samuel S. Matthews
Assistant Examiner—Richard A. Wintercorn
Attorney—Robert Louis Finkel

[57] ABSTRACT

A machine for photographically generating and/or reproducing a selected pattern on a light sensitive emulsion plate. The machine includes a moveable stage for supporting the emulsion plate, either or both an optical pattern generating projector and an optical pattern reproducing or repeating projector each having a longitudinally floating fixed focus lens barrel and a light source for directing a light beam through the barrel onto the emulsion plate, means for driving the stage to translate the emulsion plate edgewise in a prescribed motion opposite the lens barrel of either projector in such a way as to successively locate predetermined positions or addresses of the plate on the barrel axis, and means for flashing the projector light beam at preselected addresses of the emulsion plate in response to control information programmed into the machine. In its pattern generating mode, the machine is programmed to flash the light source of the pattern generating projector in such as way as to produce on the emulsion plate a latent image of a selected pattern. In its pattern repeating mode, a transparent slide or tooling plate bearing a pattern to be repeated, is inserted into the photo repeating projector and the machine is programmed to flash the projector light source at selected addresses of the emulsion plate to produce a latent image of the pattern at each selected address. The primary application of the machine involves the production of photomasks for electronic microcircuit patterns. Major features of the machine reside in an air bearing system with a moveable stage, an air gauging system for positioning each projector lens barrel relative to the emulsion plate to maintain the plate in the image plane of the projector, and a laser interferometry system for sensing the position of the moveable stage along mutually perpendicular axes and controlling the stage drive means to reflect precise positioning of each emulsion plate address on the optic axis of each projector lens barrel.

17 Claims, 18 Drawing Figures

INVENTOR.
WAYNE L. FOX

BY
ATTORNEY

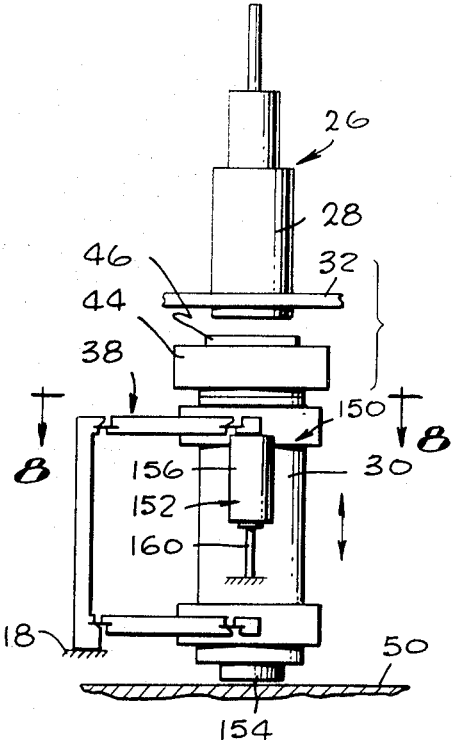
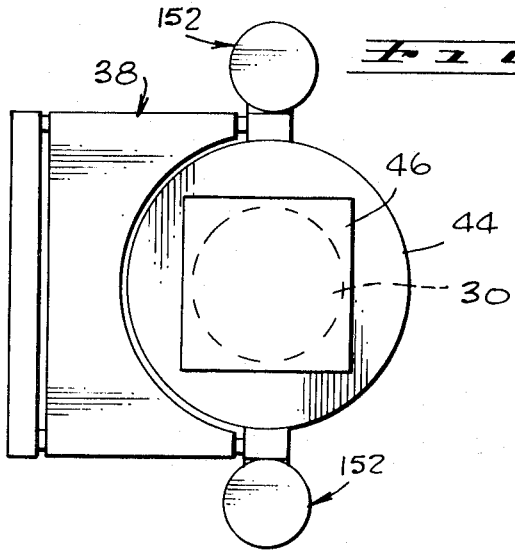
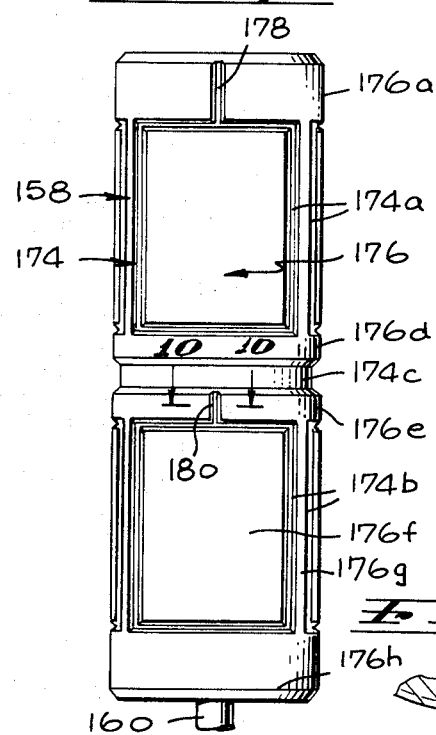
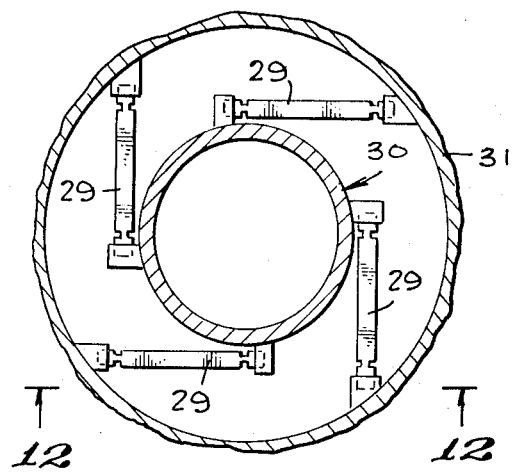
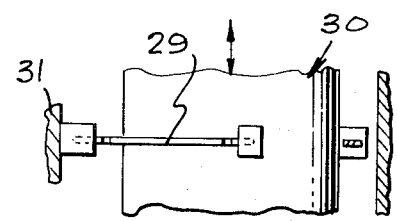
INVENTOR.
WAYNE L. FOX
ATTORNEY

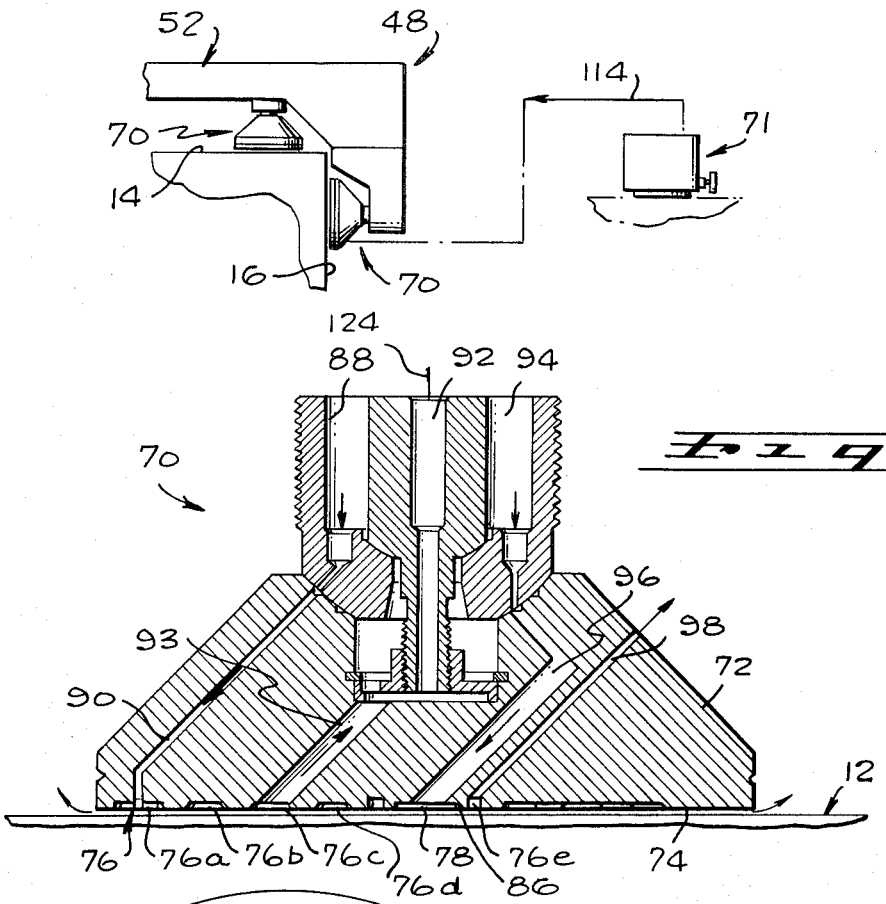
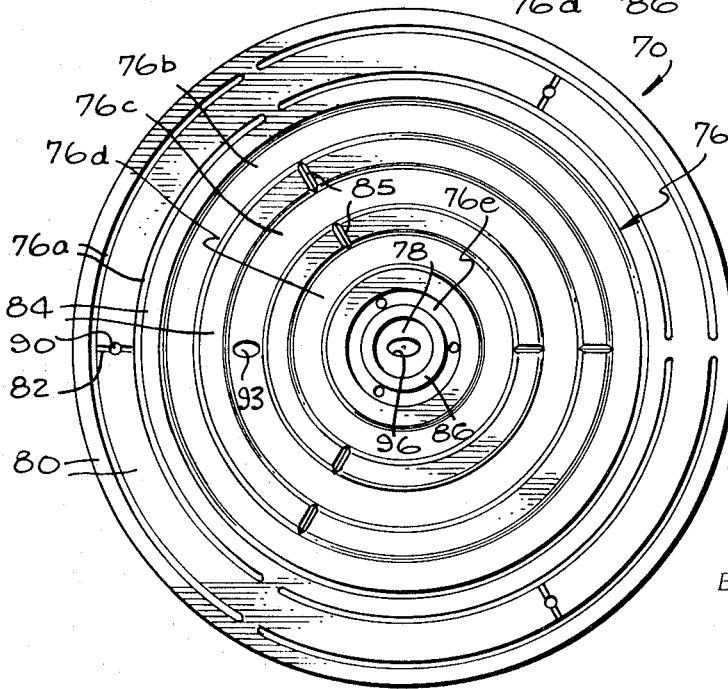

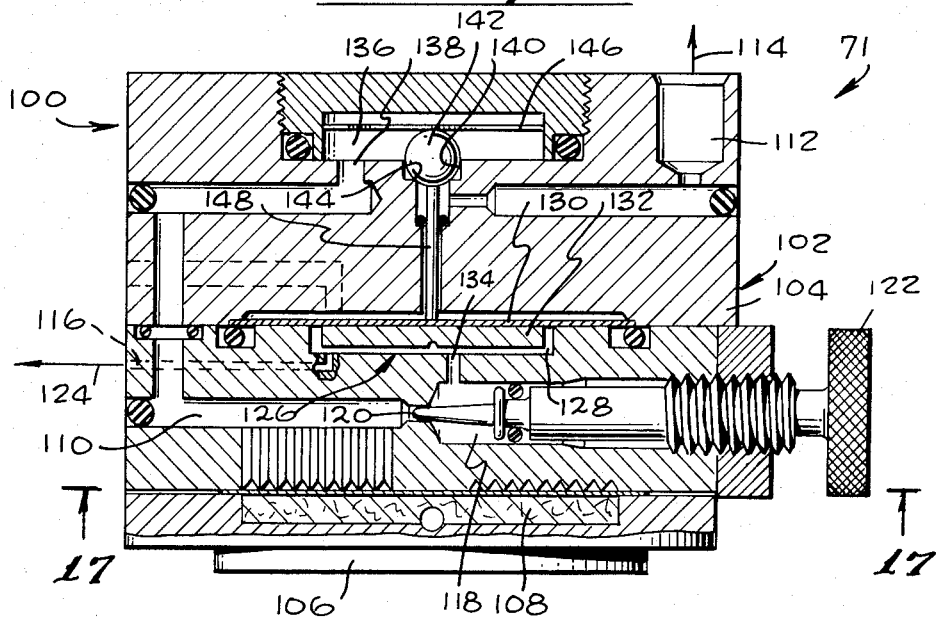
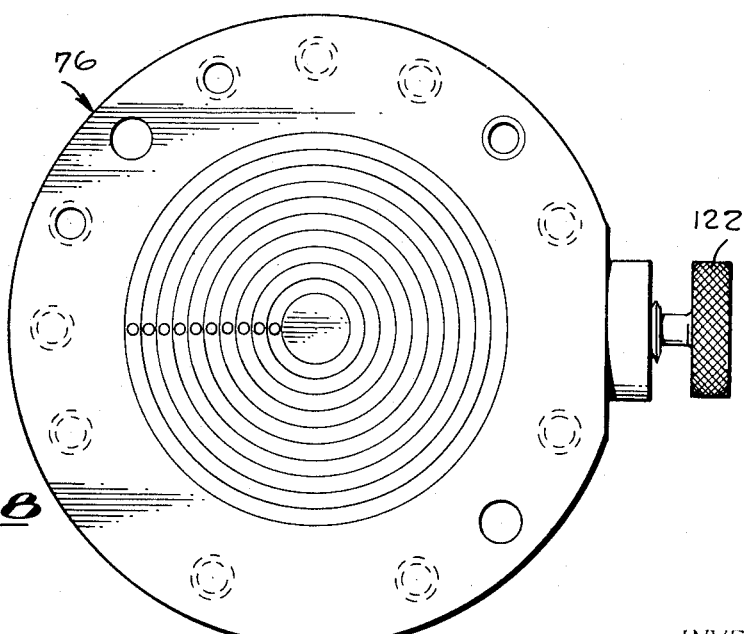
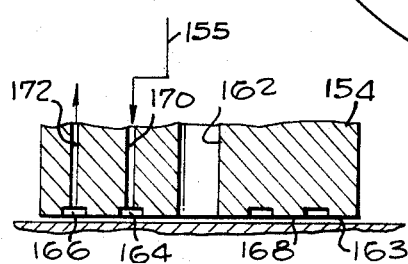

3,722,996

OPTICAL PATTERN GENERATOR OR REPEATING PROJECTOR OR THE LIKE

BACKGROUND OF THE INVENTION

1. Field of the Invention

This inventions relates generally to photographic machines and more particularly to a machine for photographically generating and/or repeating a selected pattern on a light sensitive emulsion plate.

2. Prior Art

As will appear from the ensuing description, the photographic pattern generating and repeating machine of the invention, as well as the individual features of novelty of the machine, may be employed for a variety of purposes. However, the invention is concerned primarily with the production of photomasks which are used in the production of electronic microcircuits. For this reason, the invention will be described in connection with this primary application.

The electronic industry is moving rapidly toward the production of ever larger and more complex microcircuits which require photomasks of increasing complexity and precision. The existing methods and machines for producing such photomasks for present day microcircuits are ill suited to or totally incapable of producing the photomasks required for future microcircuits. Accordingly, there is a need for an improved machine for this purpose.

SUMMARY OF THE INVENTION

The present invention provides a photographic machine which is particularly suited for producing photomasks for use in the production of electronic microcircuits. In one configuration, the present machine functions as a pattern generator for generating, on a light sensitive emulsion plate, a latent image of a selected microcircuit pattern in response to pattern information programmed into the machine. In another configuration, the machine functions as a photorepeater for reproducing or repeating the generated microcircuit pattern on a light sensitive emulsion plate.

To this end, the machine is equipped with a frame mounted over the flat top surface of a base and supporting either or both a pattern generating projector and a photorepeating projector. Each projector includes a vertically floating, fixed reduction lens barrel and a light source for directing a light beam through the barrel toward the base. Moveable along the top surface of the base, across the underside of the barrel of either projector, is a stage for holding a light sensitive emulsion plate in a plane parallel to the surface and normal to the optic axis of the projector barrel. A novel stage air bearing system is provided for both pneumatically floating the stage on and pneumatically holding the stage to the base.

Also embodied in the machine are stage drive means controlled by a programable control system for driving the stage along the top surface of the base in such a way as to translate the emulsion plate edgewise in a prescribed motion opposite the lower end of either projector and its barrel. This prescribed motion of the emulsion plate occurs in such a way that the optic axis of the lens barrel traces out on the plate a number of parallel address rows each defining a number of successive addresses on the plate. The position of the stage along two mutually perpendicular axis is continuously sensed by a novel laser interferometry stage position sensing system. Embodied in this sensing system are means for continuously generating control information representing the emulsion plate address currently situated on the lens barrel axis. A projector light source flashing circuit, controlled by the address information from the stage position sensing circuit, flashes the projector light source at preselected emulsion plate addresses in response to control information programmed into the machine, thus to expose each selected emulsion plate address to the projector light beam.

Each projector is equipped with a novel air gauging system for vertically positioning its lens barrel relative to the emulsion surface of the emulsion plate. This air gauging system is effective to maintain the emulsion surface of the plate precisely in the image plane of the projector.

The pattern generating projector is utilized in the pattern generating mode of the machine and is provided with an adjustable shutter mechanism located in the object plane of the projector. This shutter mechanism defines a rectangular aperture and is adjustable to vary the size, shape, and angular orientation of the aperture about the optic axis of the projector lens barrel. In this pattern generating mode of the machine, the light source of the pattern generating projector is flashed at preselected addresses of the emulsion plate, in response to microcircuit pattern information programmed into the machine, in such a way as to produce on the emulsion plate a latent image of a selected microcircuit pattern. The emulsion plate is then photographically developed to expose the circuit pattern. This pattern is photographically transferred on predetermined scale to a transparent tooling plate which is employed in the pattern repeating mode of the machine.

The photorepeating projector is employed in this pattern repeating mode of the machine and is equipped with a holder for positioning the transparent tooling plate in the object plane of the projector. In this mode, a new emulsion plate is placed on the moveable stage and a light source of the photorepeating projector is flashed at successive addresses of the emulsion plate, in response to pattern repetition information programmed into the machine, to produce at each exposed address of the emulsion plate the latent image of the generated circuit pattern. If desired, the machine may be programmed to leave unexposed preselected emulsion plate addresses for subsequent exposure of these addresses with a specially prepared test or reference pattern by special programming of the machine.

The primary features of novelty of the machine reside in the air bearing system for the moveable stage, the air gauging system for the projector lens barrels, and the laser interferometry system for sensing the position of the moveable stage. While these features are disclosed in connection with a machine for generating and reproducing a repeating electronic microcircuit pattern, it will become evident from the ensuing description that such features are capable of general application and are not limited to use in the present pattern generating and repeating machine.

BRIEF DESCRIPTION OF THE DRAWINGS

FIG. 5 is a partial elevation of the pattern generating camera of FIG. 1;

FIG. 6 is a partial sectional view of the aperture mechanism of the pattern generating camera of FIG. 5;

FIG. 7 is a partial elevation of the photorepeater camera of FIG. 1;

FIG. 8 is a partial sectional view of the supporting structure of the photorepeater camera of FIG. 1;

FIG. 9 is an elevation of a plunger air bearing of the subject invention;

FIG. 10 is a fragmentary sectional view of a portion of the plunger air bearing of FIG. 9;

FIG. 11 is a fragmentary horizontal sectional view of an alternate suspension arrangement for the barrels of the camera of FIG. 1;

FIG. 12 is a fragmentary vertical sectional view of the suspension arrangement of FIG. 11;

FIG. 13 is a fragmentary elevation of the base stage of the device of FIG. 1 showing two of the air bearings of the subject invention;

FIG. 14 is a vertical section of an air bearing of the subject invention;

FIG. 15 is a plan view of the underside of the air bearing of FIG. 14;

FIGS. 16 and 18 are vertical sectional views of an air regulator embodying the subject invention; and FIG. 17 is a horizontal sectional view of the regulator of FIG. 16, taken in the direction 17—17.

DESCRIPTION OF THE PREFERRED EMBODIMENTS

Figure 1:
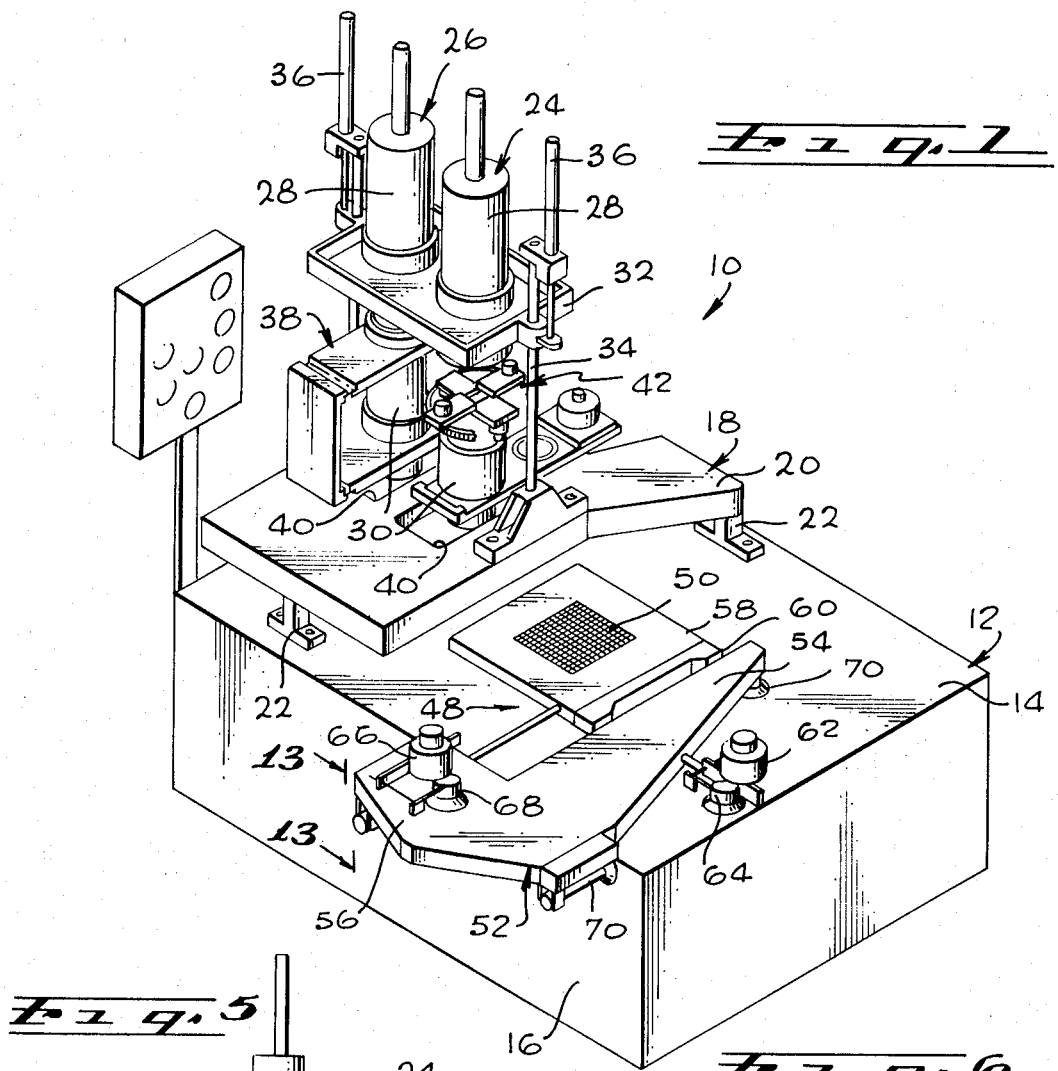
FIG. 1 is a perspective view of a composite photorepeater and pattern generator embodying the features of the subject invention.

The drawings illustrate a photographic pattern machine 10 according to the invention which is capable of both generating any desired electronic microcircuit pattern on a light sensitive emulsion plate and repeatingly projecting such a pattern at a selected address on a light sensitive emulsion plate. The machine has a base 12 in the form of a massive granite block within a flat horizontal top surface 14 and a flat edge surface 16 intersecting the top surface at right angles. Mounted over the base is a frame 18. Frame 18 has a horizontal platform 20 supported in spaced relation above the base surface 14 by means of legs 22 anchored to the base.

Mounted on the frame 18 are a pair of optical projectors 24 and 26. Projector 24 is utilized when the machine 10 is operated in its pattern generating mode and is hereafter referred to as a pattern generating projector. Projector 26 is utilized in the photorepeating mode of the machine and is hereinafter referred to as a photorepeating projector. Except for certain differences to be explained presently, the two projectors are identical.

Projectors 24, 26 are arranged side by side over the frame platform 20 and have upper collimated light sources 28 and lower fixed reduction lens barrels 30. Each light source and lens barrel is arranged on a common vertical axis normal to the base surface 14. Light sources 28 are carried on an upper horizontal platform 32 supported for vertical movement on a pair of vertical guide rods 34 rising from the frame platform 20. Platform 32 may be raised and lowered by means of actuators 36. The lower lens barrels 30 are supported on the frame 18 for vertical axial movement by structural parallelogram support 38.

Alternatively one or both of the lower lens barrels 30 may be supported for axial movement by the parallelogram support arrangement illustrated in FIGS. 11 and 12, wherein the barrels 30 are suspended from the inner ends of a plurality of upper and lower flexible arms 29, the outer ends of which are affixed to a collar mounted on the frame 18.

The lower ends of the barrels project through openings 40 in the frame platform 20. As thus far described, the projectors 24, 26 are identical and each is so arranged that a light beam from its light source 28 is projected downwardly through its lens barrel 30 along the optic axis of the barrel.

The projectors 24, 26 differ in that the pattern generating projector 24 has an adjustable shutter mechanism 42 located in the object plane of the projector at the upper end of its lens barrel 30. This adjustable shutter mechanism is conventional and hence need not be explained in elaborate detail. Suffice it to say that the shutter mechanism defines a rectangular aperture on the optic axis of the lens barrel and is adjustable to vary the size and shape of the aperture as well as the angular orientation of the aperture about the optic axis of the barrel. The photorepeating projector 26 has a holder 44 at the upper end of its lens barrel 30 for positioning a transparent tooling plate 46 in the object plane of the projector. As noted earlier and will be hereinafter explained in greater detail, a tooling plate 46 bears a microcircuit pattern which is generated by the machine in its pattern generating mode and is reproduced or repeated a number of times in the photorepeating mode of the machine.

From the description of the machine to this point, it will be understood that the pattern generating projector 24 projects toward the base 12 an optical image of the rectangular aperture defined by the adjustable shutter mechanism 42 of the projector. This aperture image is brought to sharp focus in an image plane of the projector located a slight distance below the lower end of and normal to the optic axis of the projector lens barrel 30. Similarly, the photorepeating projector 26 projects toward the base an optical image of the microcircuit pattern on the tooling plate 46. This image is brought to sharp focus in an image plane of the projector located a slight distance below the lower end of and normal to the optic axis of the projector lens barrel. Since the lens barrels each have a fixed focus, it will be understood that the image plane of each barrel has a fixed spacing from the lower end of the barrel.

Moveable along the top surface 14 of the base 12 is a stage 48 for holding a light sensitive emulsion plate 50. The stage has a generally L-shaped frame 52 with a tapered arm 54 extending across the base surface 14, normal to the base edge surface 16, and an arm 56 beyond and extending generally parallel to the base edge surface. Emulsion plate 50 is mounted in a plate holder 58 which is attached, by a slide 60, to the stage arm 54. Slide 60 supports the emulsion plate holder for movement relative to the stage along a direction line normal to the base edge surface 16.

Mounted on the base surface 14, adjacent one end of the base 12, is a servo drive motor 62. Motor 62 is coupled to the stage arm 54 through a linear extension mechanism 64 in a manner such that the motor is operable to drive the stage 48 back and forth parallel to the base edge surface 16. Mounted on the stage arm 56 is a servo drive motor 66. Motor 66 is coupled to the emulsion plate holder 58 through a linear extension mechanism 68 in a manner such that the motor is operable to drive the plate holder back and forth relative to the stage in a direction normal to the base edge surface 16.

From this description, it will be understood that the servo motors 62, 66 are operable to selectively drive the emulsion plate 50 parallel to two mutually perpendicular axes, one parallel to and the other normal to the base edge surface 16. For convenience in the ensuing description, the axis parallel to the base edge surface 16 is referred to as the x-axis and the axis normal to the base edge surface 16 is referred to as the y-axis.

Stage 48 is equipped with air bearings 70 to support the stage frame 52 on the base surfaces 14, 16 for frictionless movement of the stage along the base. These stage air bearings are identical and each has a generally conical bearing member 72 with a flat circular bearing surface 74 facing the respective base surface. Concentrically formed in this bearing surface are a number of annular grooves 76 and a center recess 78. Proceeding from the outer edge toward the center of the bearing surface, the grooves 76 include a pair of air distribution grooves 76a, three vacuum grooves 76b, 76c, 76d and an atmospheric groove 76e. The two air distribution grooves 76a define an intervening annular bearing 80 and are divided into three separate 120° sectors. The two grooves of each sector communicate via a cross groove 82 in the bearing 80. The vacuum grooves 76b, 76c, 76d define intervening annular lands 84 and communicate through cross grooves 85 in the lands. The air atmospheric groove 76e and recess 78 define an intervening gauging land 86.

Entering the upper end of the bearing member 72 is a high pressure air inlet 88 which communicates by passages 90 to the air distribution grooves 76a. The center vacuum groove 76c communicates to a vacuum outlet 92 at the upper end of the bearing member through a passage 93. A gauging air inlet 94 enters the upper end of the bearing member 72 and communicates through passages 96 to the center bearing recess 78. Inlet passage 98 communicates the atmospheric groove 76e to atmosphere.

Indicated at 71 is an air pressure regulating system 100 for supplying air to the stage air bearings 70 at a regulated pressure. This pressure regulating system comprises a pressure regulator 102 having a body 104 with a high pressure air inlet 106. Inlet 106 communicates, through a filter 108 and a high pressure air passage 110, to a high pressure air outlet 112 in the regulator body 104. Outlet 112 connects, through an air line 114, to the high pressure air inlets 88 of the stage gas bearings 70. A regulator air inlet 106 also communicates to a gauging air outlet 116 in the regulator body 104 through a passage 118 containing a needle valve 120. Needle valve 120 is adjustable by a handle 122 accessible externally of the regulator. The gauging air outlet 116 connects, through a gauging air line 124, to the gauging air inlets 94 of the stage air bearings 70.

Included in the pressure regulator 102 is a pressure regulating valve mechanism 126 for regulating the air pressure to the stage bearings 70 in response to the gauging air pressure in the central recess 78 of the stage bearings. Valve mechanism 126 includes a chamber 128 in the gauging air passage 118. This chamber contains a flexible diaphram 130 which is peripherally secured and sealed to the regulator body 104 and extends across the upper side of the chamber. Fixed to the underside of diaphram 130 is a stiffening disc 132. The inlet and outlet portions of the gauging air passage 118 open the chamber 128 to ports 134 in the bottom wall of the chamber.

A portion of the high pressure air passage 110 is enlarged to form a chamber 136. Inlet and outlet portions of the air passage open this chamber to ports 138, 140 in the bottom wall of the chamber. The outlet port 140 contains a valve ball 142 which is moveable into and from engagement with a valve seat 144 about the port and regulates the air pressure at the downstream side of the ball. Valve ball 142 is yieldably urged against the valve seat 144 by a diaphram or wave spring 146. A valve ball lift pin 148 extends between the valve diaphram 130 and valve ball 142.

During operation of the stage bearing regulating system 100, high pressure air is fed to the stage bearings 70 through the pressure regulator outlet 114. This high pressure air enters the outer air distribution grooves 76a in the stage bearings 70 and flows radially out under the bearing land 80 to generate between this land and the base surfaces 14, 16 air bearing films which pneumatically float the stage on the base. Gauging air is fed to the center recess 78 of the stage bearings 70 through the pressure regulator outlet 116. This gauging air flows radially out under the gauging lands 86 of the stage bearings into the atmospheric grooves 76b from whence the air vents to atmosphere.

It will be understood from the above description that increasing air pressure to the stage bearings 70 increases the spacing between the stage bearing surfaces 74 and the base surfaces 14, 16. This increase in spacing increases the flow of gauging air from the center stage bearing recesses 78 to the atmosphere and thus reduces the gauging air pressure in the recesses. Decreasing air pressure to the stage bearings has the reverse effect. The gauging air pressure within the stage bearing recesses 70 represents, i.e. is inversely proportional to, the spacing between the stage bearings surfaces and the base surfaces.

The pressure regulator 102 regulates the air pressure through the stage bearings 70 in response to this gauging air pressure in such a way as to maintain a fixed spacing between the stage bearing surfaces 74 and base surfaces 14, 16. In this regard, it is evident that a decrease in the surface spacing increases the gauging air pressure in the stage bearing recesses 70. This increasing gauging air pressure reacts on the pressure regulator diaphram 130 and deflects the latter upwardly to move the valve ball 142 away from its valve seat 144. The air pressure to the stage bearing 70 is thereby increased to increase the spacing between the stage bearing and base surfaces. An increase in the surface spacing has the opposite effect of lessening the gauging air pressure on the regulator diaphram 130 to effect spring return of the valve ball 142 towards valve seat 144. This reduces the air pressure to the stage bearings to reduce the bearing-base surface spacing. The surface spacing is adjustable by regulation of the needle valve 120 to adjust the gauging air pressure to the stage bearings.

It will be recalled that the stage bearings 70 have vacuum grooves 76b, 76c, 76d and vacuum outlets 92. These outlets are connected to a vacuum source for evacuating the vacuum grooves to produce a differential pressure on the stage bearings for holding the latter to the base surfaces 12, 16.

As noted earlier, and will be explained in greater detail presently, during operation of the subject machine in both its pattern generating and photorepeating modes, the servo motors 66, 62 are operated to drive the emulsion plate holder 58 back and forth parallel to the y-axis and, to step the entire stage 48 parallel to the x-axis. In the pattern generating mode, this motion of the stage occurs when the emulsion plate 50 is positioned below the lens barrel 30 of the pattern generating projector 24. In the photorepeating mode, the stage motion occurs with the emulsion plate positioned below the lens barrel of the photorepeating projector 26. In each mode, the stage motion is such that the optic axis of the adjacent lens barrel traces out on the emulsion plate a number of parallel transverse rows, each defining successive addresses.

Each projector 24, 26 is equipped with lens barrel positioning means 150 for maintaining the lens barrel 30 of the respective projector at a fixed distance above the emulsion surface of the emulsion plate 50 as the latter travels back and forth below the barrel. The lens barrel is positioned in such a way as to maintain the upper emulsion surface of the emulsion plate in the image plane of the projector.

The barrel positioning means 150 of each projector 24, 26 comprises an air pressure actuator 152 for moving the respective lens barrel 30 vertically, and air gauging means 154, similar to an air bearing, for generating a gauging pressure representing the vertical position of the barrel relative to the emulsion surface of the emulsion plate 50, and an air pressure regulator 155, like that of the stage air bearing system, for regulating the air pressure through the actuator 152 in such a way as to maintain the barrel at an elevation wherein the emulsion surface of the emulsion plate is located in the image plane of the projector.

The particular air pressure actuator 152 shown comprises an upper cylinder 156 fixed to the projector barrel 30 and a plunger 158 moveable in the cylinder. The plunger has a rod 160 projecting from the lower end of the cylinder into contact with a surface on the frame 18. Regulated air pressure from the pressure regulator 155 enters the upper end of the cylinder to urge the plunger 158 downwardly and thereby urge the lens barrel upwardly. Increasing the air pressure thus elevates the lens barrel. Reducing the air pressure permits the barrel to lower under the action of gravity, aided by a return spring, if necessary.

The air gauging means at the lower end of each projector lens barrel 30 comprises an annular gauging member 160 having a central opening 162 through which the projection light beam passes and a lower horizontal gauging surface 163. Formed in this gauging surface are concentric annular air distribution and atmospheric grooves 164, 166. These grooves define an intervening angular gauging line 168. Distribution groove 164 receives air under pressure from the gauging air outlet of the barrel positioning air pressure regulator 155 through a passage 170 in the gauging member. The atmospheric groove 166 communicates to atmosphere through a vent passage 172. The high pressure air outlet of the regulator 155 connects to the cylinder 156 of the barrel positioning actuator.

It will be immediately recognized that the barrel positioning means 150 for each projector 24, 26 operates in much the same manner as the stage air bearing system to maintain a fixed spacing betwen the emulsion surface of the emulsion plate 50 on the stage 48 and the bottom gauging surface 163 of the gauging member 160. However, in the case of the barrel positioning means, the regulated high pressure air from the pressure regulator 155 pressurizes the barrel positioning actuator 152 to vertically position the lens barrel 30 relative to the emulsion plate. The spacing between the gauging surface 163 and the emulsion surface of the emulsion plate 50 is adjusted by the regulator needle valve to a setting wherein the upper emulsion surface of the emulsion plate is located precisely in the image plane of the projector.

The structural support 38 for each projector barrel 30 permits essentially frictionless vertical movement of the barrel. The actuator 152 for each lens barrel is equipped with air bearing means for its plunger 158 to preserve its frictionless barrel movement. This plunger air bearing means comprises a number of air distribution grooves 174 in the cylindrical wall of the plunger which communicate with the cylinder air chamber at the upper end of the piston and define bearing lines 176 on the plunger. The high pressure air is delivered to the cylinder, the air enters these grooves and flows downwardly across the bearing lines to generate air bearing films between the plunger and the cylinder wall. According to a feature of the invention in this regard, the cross-sectional area of the grooves increases toward the lower end of the piston to reduce the resistance to air flow through the grooves and thereby assure the generation of effective air bearing films along the full length of the plunger.

The plunger air bearing configuration shown comprises a first set of annular air distribution grooves 174a spaced circumferentially about the upper end of the plunger, a second set of annular air distribution grooves 174b spaced about the lower end of the plunger, and a central relatively large equalization groove 174c extending circumferentially about the center of the plunger. The bearing line 174b defined by these grooves comprise an upper circumferential line 176a, generally rectangular lines 176b and narrow longitudinal lines 176c spaced circumferentially about the upper end of the plunger, circumferential lines 176d, 176e at opposite sides of the equalization groove 174c, generally rectangular lines 176f and narrow longitudinal lines 176g spaced circumferentially about the lower end of the plunger, and a bottom circumferential line 176h. Longitudinal grooves 178, 180 in the lines 176a, 176e communicate the upper annular grooves 174a to the cylinder chamber above the plunger and the lower annular grooves 174b to the central equalization groove 174c.

When air is supplied to the projector barrel positioning actuators 152 to vertically position the projector barrels 30 relative to the emulsion plate 50 in the manner explained earlier, the air flows downwardly to the actuator plunger grooves 174 and across the plunger bearing lines 176 to generate between these lines and cylinder wall bearing films which permit frictionless movement of the plunger in the cylinder. A further feature of the plunger air bearing resides in the fact that the plunger grooves 180 are larger in cross-sectional area than the grooves 178 and the lines 176d, 176h are narrower than the lines 176a, 176e to progressively reduce the resistance to air flow along the plunger and thereby compensate for the air pressure drop which occurs along the plunger. This is done to achieve effective air bearing films along the full length of the plunger.

The illustrated pattern generating and repeating machine is equipped with a programmable control system 182 for operating the machine in its pattern generating and photorepeating modes. Before describing this control system, it is well to briefly describe the machine operation in each mode. During operation of the machine in its pattern generating mode, emulsion plate holder 58 is driven back and forth parallel to the y-axis of the machine and, at the end of each stroke or traverse the entire stage 48 is stepped in a direction parallel to the x-axis. The emulsion plate 50 is positioned below the pattern generating projector 24. This motion of the stage occurs in such a manner that the optic axis of the projector 24 traces out on the emulsion plate 50 a number of parallel address rows, as explained earlier. While the emulsion plate holder 58 and stage 48 are in motion, shutter mechanism 42 is being adjusted to vary the size, shape and angle of the shutter aperture. When the preselected address is reached, the projector light source 28 is flashed to produce on the emulsion plate a latent image of a selected microcircuit pattern. The emulsion plate is then developed to produce the generated pattern, after which the latter may be transferred photographically on selected scale, to the tooling plate 46.

In the photorepeater mode of the machine, a new emulsion plate 50 is positioned on the stage 48 and the tooling plate 46 is placed in position in the tooling plate holder 44 of the photorepeater mode. The state 48 is driven in the same manner as in the pattern generating mode with the emulsion plate below the photorepeater projector 26. The projector light source 28 is flashed at the successive addresses in each address row on the emulsion plate to reproduce and repeat at each address the generated pattern on the tooling plate. If desired, selected addresses of the emulsion plate may be left unexposed for subsequent exposure to a precise test pattern.

Control system 182 includes information storage means 184 for containing programmable information representing a selected microcircuit pattern to be generated in the pattern generating mode and a selected pattern duplicating or repeating sequence for the photographer mode. Also included in the control system are means 186 for sensing the position of the stage 48, means (not shown) embodied in the adjustable shutter mechanism 42 of the pattern generating projector 24 for sensing the size, shape, and angle of the projector aperture, a flashing circuit 187 for the projector light sources 28, and a control circuit 182 for controlling the stage servo motor 62, 66, the projector light source flashing circuit, and the adjustable shutter mechanism of the pattern generating projector (only during the pattern generating mode) in response to the programmed information in the storage means in the output of the stage position sensing means and shutter mechanism sensing means (only during the pattern generating mode).

As noted earlier, the shutter mechanism 42 of the pattern generating projector 24 is conventional and thus need not be explained in detail. Suffice it to say that the control circuit 188 feeds to the shutter mechanism information signals representing programmed aperture settings, i.e. aperture sizes, shapes, and angles. The shutter mechanism adjusts the aperture in response to these signals and delivers an activating signal to the projector light source flashing circuit 187 when the programmed aperture settings have been established.

The stage position sensing means 196 employed in the preferred form of the invention shown is a laser interferometric sensing system including a laser source 190 with a collimating telescope and polarizing cell 192 mounted on the machine base 12. For convenience certain components of this system which are preferably mounted on the base 12 are not so shown in FIGS. 2 and 3. The relative positions of these components have been maintained insofar as possible, however. In the embodiment illustrated the beam axis of the laser source 190 parallels the x-axis of the machine. Mounted on the base in the path of the laser beam b is a laser beam transfer slide 194 with a total reflecting surface 196 and the 50 percent reflecting surface 198. Slide 194 is moveable between its positions of FIGS. 2 and 3 to condition the stage position sensing means for the photorepeating and pattern generating modes of the machine.

Figure 2:
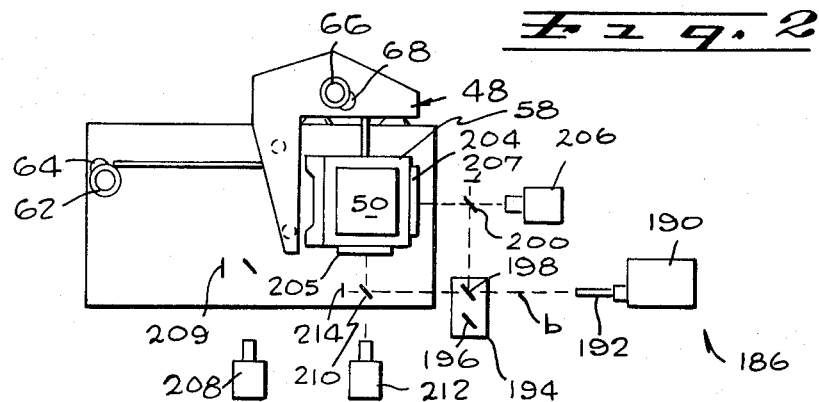
FIG. 2 is a plan view of a composite device such as that shown in FIG. 1, positioned for operation in the photorepeater mode.

Transfer slide 194 occupies the position of FIG. 2 in the photorepeater mode. In this position the laser beam b incident on reflecting surface 198 is reflected to surface 200. A portion of the beam energy incident on surface 198 passes through the face to a 50 percent reflecting surface 210 mounted on base 12. A portion of the beam is then reflected from that surface parallel to the y-axis to relecting surface 205 and then back through surface 210 to a light fringe detector 212. The remainder of beam b passes through surface 210 to total reflecting surface 214 on the base and is reflected back to the back side of surface 210 and then to detector 212.

Figure 3:
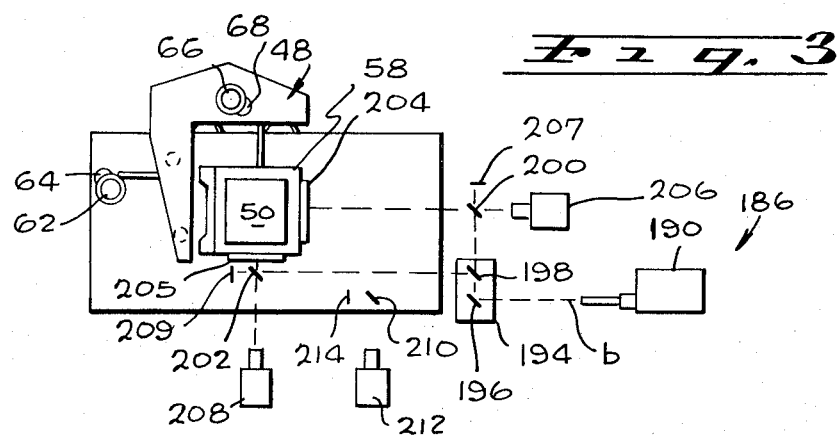
FIG. 3 is a plan view of the device of FIG. 2, positioned for operation in the pattern generating mode.

In the pattern generating mode of the machine, transfer slide 194 occupies the position shown in FIG. 3. In this position, the laser beam b is reflected from surface 196 to surface 198 parallel to the y-axis. One-half of the beam energy passes through the surface 198 to a following 50 percent reflecting surface 200 mounted on the base 12. The other half of the beam energy incident on the reflecting surface 198 is reflected parallel to the x-axis to a 50 percent reflecting surface 202 mounted on the base. A portion of the laser beam energy incident on the reflector 200 is reflected parallel to the x-axis to a total reflecting surface 204 mounted on the emulsion plate holder 58 and is then reflected back parallel to the x-axis through the surface 200 to a light fringe detector 206. The remaining portion of the laser beam incident on the surface 200 passes through the surface to a total reflecting surface 207 mounted on the base and is reflected back to surface 200 and then to the detector 206. A portion of the laser beam energy incident on the surface 202 is reflected parallel to the y-axis to a total reflecting surface 205 mounted on the holder 58 and is then reflected back parallel to the y-axis through the surface 202 to a light fringe detector 208. The remainder of the laser beam energy incident on the surface 202 passes through the surface to a total reflecting surface 209 mounted on the base and thence to the fringe detector 208.

Reflecting surface 202 and light fringe detector 208 are located on an axis which intersects the stage reflecting surface 205 over the full range of stage travel in the pattern generating mode of the machine. Reflecting surface 210 and light fringe detector 212 are located on an axis which intersects the stage reflecting surface 205 over the full range of stage travel in the photorepeater mode of the machine.

During operation of the stage position sensing system 186, in either setting of the transfer slide 194, the reflecting surfaces 207, 209, 214 serve as fixed reference surfaces. Accordingly, each detector 206, 208, 212 receives two reflected laser beams, one from the reflecting surface 204 or 205, as the case may be, and one from the corresponding reference reference surface 207, 209 or 214, as the case may be. These reflected beams combine to produce light fringes which appear to move across the face of each detector as the stage moves toward and away from the detector parallel to the detector axis. The number of fringes which pass across the face of each detector is proportional to the displacement of the stage along the axis of the detector. Each detector generates an electrical output representing the passage of each fringe across the detector face.

Figure 4:
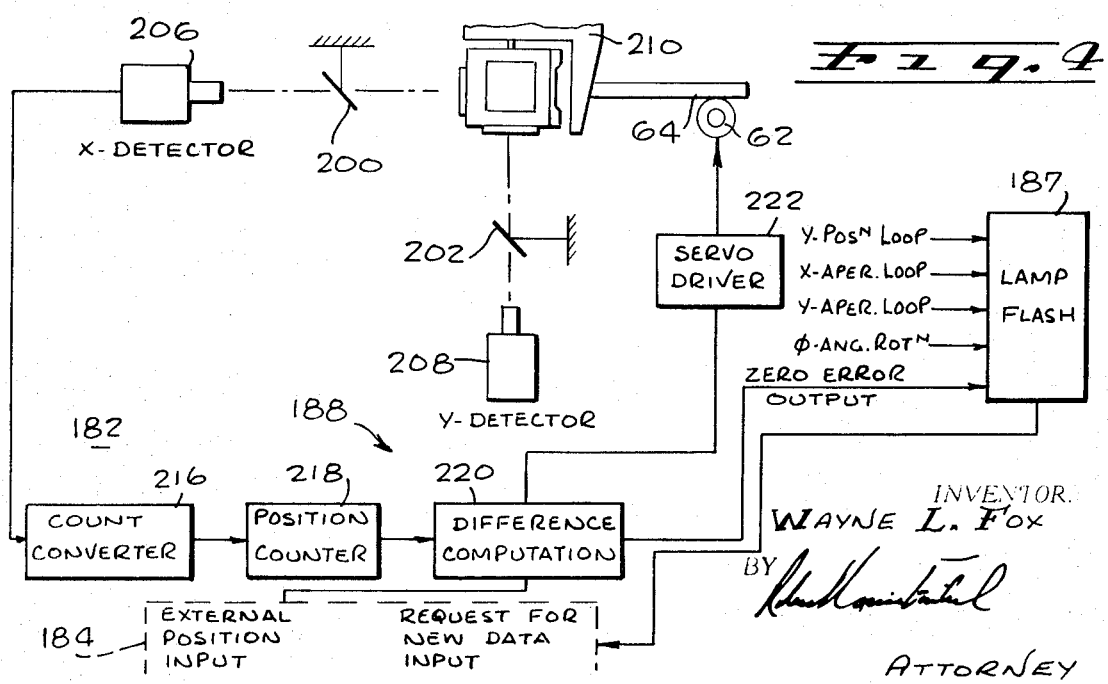
FIG. 4 is a schematic diagram illustrating a portion of the control circuitry of the composite device shown in FIGS. 1-3.

As illustrated schematically in FIG. 4, the control circuit 182 includes x and y channels each having a count convertor 216, a position counter 218, a position comparator 220, and a servo driver 222. The output of the x-axis detector 206, that is the detector which senses displacement of holder 58 along the x-axis of the machine, is applied to the count convertor 216 in the x channel. Similarly, the outputs (not shown) of the y-axis detectors 208, 212, that is the detectors which sense movement of the stage parallel to the y-axis, are applied to the count convertor of the y channel. The output of each count convertor, in turn, is applied to the position counter 218 of the respective channel. As the holder 58 moves back and forth parallel to either axis, the corresponding detector delivers to the count convertor signals representing the number of light fringes passing across the face of the detector and hence the stage displacement along the corresponding machine axis. The count convertor of each channel converts this fringe count signal into a signal representing the stage displacement in terms of selected increments of linear measurement. The position convertor 218 at each channel receives the stage displacement signal from the corresponding count convertor and maintains a running count representing the current position or address of holder 58 along the corresponding axis of the machine.

The position comparator 220 of each control circuit channel receives from the information storage means 184 electrical information representing successive programmed stage addresses along the corresponding axis of the machine and, from the respective stage position counter 218, electrical information representing the current address of holder 58 along the corresponding axis relative to some selected reference position. The position comparator compares each new programmed address from the information storage means with the current holder address from the position comparator and delivers to the respective servo motor 62 an error signal representing the difference in the addresses. This error signal actuates the servo driver to operate the corresponding stage drive motor 62, 66, as the case may be, for driving the stage 48 parallel to the corresponding axis to the new address. The holder address information programmed into the information storage means is such as to effect driving of the stage in its back and forth movement along successive parallel address rows with the emulsion plate 50 located below the optical barrel of projector 24 in the pattern generating mode and below the optical barrel of projector 26 in the photorepeater mode.

As noted earlier, in the pattern generating mode of the machine, the control system 182 feeds to the adjustable shutter mechanism 42 of the pattern generating projector 24 programmed aperture information representing successive aperture settings of the shutter mechanism. This aperture information is delivered to the shutter mechanism with each new x and y address to the x and y channel position comparators 220.

The projector light source flashing circuit 187 receives inputs from the shutter mechanism 42 of the pattern generating projector 24 (only in the pattern generating mode) and from the positioned comparators 220 of the x and y control circuit channels. When the aperture setting of the shutter mechanism and the current address of the stage 48 correspond to the programmed aperture setting and stage address information from the information storage means, these inputs are null or zero error signals. Concurrence of these null signals activates the flashing circuit to flash once the light source 28 of the pattern generating projector 24 during the pattern generating mode and the light source of the photorepeater projector 26 during the photorepeater mode. Simultaneously with each light flash, the flashing circuit 187 feeds a trigger signal to the information storage means to cause the latter to supply the next programmed aperture setting and or stage address information to the machine.

The operation of the present pattern generating and repeating machine is now obvious. Thus, in the pattern generating mode of the machine, the information storage means 184 is programmed with information representing a selected microcircuit pattern to be generated. This information defines successive addresses on the emulsion plate 50 which must be exposed by the light beam of the pattern generating projector 24 and the successive aperture projector settings required at each address to produce on the emulsion plate a latent image of the selected pattern. The stage air bearing system, the optical barrel positioning means of the pattern generating projector, and a control system of the machine are then activated to initate the pattern generating cycle of the machine.

During this pattern generating cycle, the programmed information representing the successive stage addresses and successive projector aperture settings are read out in succession. This information readout effects driving of the stage 48 across the underside of the optic barrel 30 of the pattern generating projector 24 in such a way as to locate the programmed addresses in the several address rows of the emulsion plate 50 on the projector axis in succession, row by row. The projector shutter mechanism 42 is adjusted to the program settings for each address. When the emulsion plate 50 is precisely situated at each programmed address, and the projector aperture is properly set for the address, the flashing circuit 187 is actuated to flash the projector light source 28. This exposes the corresponding address on the emulsion plate to produce on the plate latent image of one point of the programmed microcircuit pattern. The same action continues through the several address rows on the emulsion plate in succession to produce on the emulsion plate 50 a latent image of the programmed microcircuit pattern.

It is significant to recall here that during the above operation of the machine, as well as during subsequent operation of the machine in its photorepeater mode, the projector barrel 30 is continuously positioned relative to the upper emulsion surface of the emulsion plate 50 by the air gauging action described earlier. This gauging action maintains the emulsion surface of the plate precisely in the image plane of the projector so as to produce on the plate a sharply defined latent image of the programmed microcircuit pattern regardless of the thickness of the emulsion plate.

After the latent image of the program microcircuit pattern has been generated on the emulsion plate 50, the latter is developed to produce the pattern on the emulsion plate. The generated pattern is then photographically transferred to the tooling plate 44.

The machine is now conditioned for its photorepeater operation by placing the tooling plate 48 in the photorepeater projector 26 and programming the desired pattern repeating sequence into the information storage means 184. During machine operation in this photorepeater mode, the emulsion plate 50 on the stage 48 is back and forth across the underside of the photorepeater projector 26 through successive address rows in the same manner as during the pattern generating mode. The projector light source 28 is flashed at successive addresses in each row to produce at each address a latent image of the generated microcircuit pattern. As noted earlier selected addresses on the emulsion plate may be left unexposed for subsequent exposure to a test pattern by special programming of the machine.

What is claimed is:

1. A machine for photographically recording a pattern on a light sensitive emulsion plate comprising:
   a supporting base having a flat top surface,
   a supporting frame mounted over said base,
   an optical projector on said frame including a lens barrel positioned with its optical axis normal to said base surface, means supporting said barrel on said frame for axial movement toward and away from said base surface, and a light source above said barrel for directing a light beam through said barrel towards said base,
   a stage for holding said emulsion plate,
   gas bearing means for pneumatically floating said stage on said base surface for movement along said base surface across the underside of said lens barrel including gas bearing surfaces on said stage facing said base surface, means for generating gas bearing films between said base surface and first portions of said bearing surfaces, means for generating between said base surface and second portions of said bearing surfaces a control gas pressure related to the space between the bearing and base surfaces, means responsive to said control pressure for regulating the bearing gas pressure to said gas bearing means to maintain a fixed spacing between said bearing surfaces and said base surface such that said stage supports said emulsion plate in a plane parallel to said base surface, and means for reducing the gas pressure between said base surface and third portions of said stage bearing surfaces below the ambient atmospheric pressure to urge said stage toward said base,
   lens barrel positioning means including a gauging surface on the lower end of said lens barrel facing the upper surface of said emulsion plate, means for generating between said gauging surface and plate surface a control pressure related to the spacing between the latter surfaces, and a lens barrel positioning device for vertically adjusting said lens barrel in response to the latter control pressure to maintain a fixed spacing between said gauging surface and plate surface,
   means for selectively driving said stage in directions parallel to two mutually perpendicular coordinate axes to locate different addresses of said emulsion plate on the optical axis of said lens barrel,
   a laser interferometric sensing system for sensing the position of said emulsion plate along each coordinate axis, and
   a programmable control system operatively connected to said drive means and sensing system for actuating said drive means to drive said emulsion plate through a series of predetermined addresses in succession and flashing said light source at selected addresses.

2. The subject matter of claim 1 wherein:
   said base has a flat edge surface intersecting said top base surface and paralleling one of said coordinate axes, and said stage is provided with additional gas bearing means for pneumatically floating said stage on said base edge surface including additional gas bearing surfaces on said stage facing said edge surface, means for generating gas bearing films between said edge surface and first portions of said additional bearing surfaces, means for generating between said edge surface and second portions of said additional bearing surfaces control pressures related to the spacing between said edge surface and said additional bearing surfaces, and means responsive to the latter control pressures for regulating the bearing gas pressure to said additional gas bearing means to maintain a fixed spacing between said base edge surface and said additional bearing surfaces.

3. The subject matter of claim 2 wherein:
said stage gas bearing means further comprise means for reducing the gas pressure between said base surfaces and third portions of said gas bearing surfaces below the ambient atmospheric pressure for holding said stage to said base.

4. The subject matter of claim 3 wherein:
said stage gas bearing means and additional gas bearing means comprise a number of bearing pads on said stage each having a bearing surface facing the respective base surface and containing a plurality of alternating lands and grooves and a center recess, means for feeding a gas under pressure to one of said grooves, whereby said gas flows radially outwardly under an adjacent land to generate a gas bearing film, means for feeding a gas under pressure to said center recess, whereby the latter gas flows radially outwardly under an adjacent land into an adjacent second groove to produce in said second groove said control pressure related to the spacing between the pad bearing surface and the respective base surface, and means for partially evacuating a third groove to reduce the gas pressure within said third groove below the ambient atmospheric pressure.

5. The subject of claim 1 wherein:
said stage gas bearing means comprises a number of bearing pads on said stage each having a bearing surface facing the respective base surface and containing a plurality of alternating lands and grooves, and a center recess, means for feeding a gas under pressure to one of said grooves, whereby said gas flows outwardly under an adjacent land to generate a gas bearing film, means for feeding a gas under pressure to said center recess, whereby the latter gas flows outwardly under an adjacent land into an adjacent second groove to produce in said second groove said control pressure related to the spacing between the paid bearing surface and the respective base surface, and means for partially evacuating a third groove to reduce the gas pressure within said third groove below the ambient atmospheric pressure.

6. The subject matter of claim 1 wherein:
said lens barrel positioning device comprises a fluid actuator acting between said frame and lens barrel to effect axial movement of said barrel in one direction in response to increasing lens barrel control pressure and in the opposite direction in response to decreasing lens barrel control pressure.

7. The subject matter of claim 6 wherein:
said lens barrel actuator comprises a pneumatic cylinder and piston, and fluid bearing means for generating a fluid bearing film between said piston and the wall of said cylinder.

8. The subject matter of claim 1 wherein:
said stage position sensing system comprises means for sensing the stage position along each coordinate axis including a reflecting mirror on said stage normal to the respective coordinate axis, a fixed reference mirror on said base, a source of a polarized laser beam, means for splitting said beam and reflecting the beam portions from said stage mirror and reference mirror, respectively, and then recombining the reflected beam portions into a single reflected beam, and a light fringe detector mounted on said base for receiving said combined reflected beam.

9. The subject matter of claim 8 wherein:
the two stage position sensing means for sensing stage position along said coordinate axes, respectively, comprise a single common laser beam source, and means for splitting the laser beam from said laser beam source and directing the split beam portions to said two stage position sensing means, respectively.

10. The subject matter of claim 1 wherein:
said lens barrel supporting means comprise a pair of concentric outer and inner collars surrounding each end of said barrel, means securing the inner collar to said barrel, means securing the outer collars to said frame, a set of resilient members circumferentially spaced about and extending tangentially of said inner collar and means securing the ends of said resilient members to said collars.

11. A machine for photographically recording a pattern on a light sensitive emulsion plate comprising:
a supporting base having a flat top surface,
a supporting frame mounted over said base,
an optical projector on said frame including a lens barrel positioned with its optical axis normal to said base surface, means supporting said barrel on said frame for axial movement toward and away from said base surface, adjustable shutter means defining an aperture of variable configuration and angular orientation on said optical axis, and a light source above said barrel for directing a light beam through said barrel towards said base,
a stage for holding said emulsion plate,
gas bearing means for pneumatically floating said stage on said base surface for movement along said base surface across the underside of said lens barrel including gas bearing surfaces on said stage facing said base surface, means for generating gas bearing films between said base surface and first portions of said bearing surfaces, means for generating between said base surface and second portions of said bearing surfaces a control gas pressure related to the space between the bearing and base surfaces, and means responsive to said control pressure for regulating the bearing gas pressure to said gas bearing means to maintain a fixed spacing between said bearing surfaces and said base surface such that said stage supports said emulsion plate in a plane parallel to said base surface,
lens barrel positioning means including a gauging surface on the lower end of said lens barrel facing the upper surface of said emulsion plate, means for generating between said gauging surface and plate surface a control pressure related to the spacing between the latter surfaces, and a lens barrel positioning device for vertically adjusting said lens barrel in response to the latter control pressure to maintain a fixed spacing between said gauging surface and plate surface, means for selectively driving said stage in directions parallel to two mutually perpendicular coordinate axes to locate different addresses of said emulsion plate on the optical axis of said lens barrel, a laser interferometric sensing system for sensing the position of said emulsion plate along each coordinate axis, and a programmable control system operatively connected to said drive means and sensing system including means for actuating said drive means to traverse said stage parallel to one coordinate axis and step said stage parallel to the other coordinate axis in a manner such that the optical axis of said lens barrel traces out on said emulsion plate a number of parallel address rows each comprising a plurality of addresses, information storage means containing information representing selected addresses along said address rows, and selected aperture configurations and angles for said addresses, means for adjusting said shutter means to each such aperture configuration and angle, and means for flashing said light source at said selected addresses.

12. A fluid bearing comprising:

a bearing member having a bearing surface in confronting relation to a supporting surface, means for feeding a fluid under pressure to a first region of said bearing surface to generate a fluid bearing film between said surface region and said supporting surface for floating said bearing member on said supporting surface, means for feeding a fluid under pressure to a second region of said bearing surface to generate gauging fluid pressure related to the space between said surfaces, and means for monitoring said gauging pressure, means for regulating the pressure of said fluid bearing film in response to said gauging pressure to control the spacing between said surfaces, and means for partially evacuating the space between a third region of said bearing surface and said supporting surface to reduce the pressure in said space below the ambient atmospheric pressure and thereby urging said bearing member toward said supporting surface.

13. The subject matter of claim 12 wherein:

said first surface region comprises a bearing line adjacent the outer perimeter of said bearing surface, and said means for feeding fluid to said first region comprises first fluid distribution grooves bounding said line and passage means communicating with said grooves for feeding fluid under pressure to said grooves, said second surface region comprises a gauging groove in said bearing surface, said gauging pressure generating means comprises a second fluid distribution groove adjacent said gauging groove, a gauging line between said second fluid distribution and gauging grooves, and passage means communicating with said second distribution groove for feeding fluid under pressure thereto, whereby the fluid flows across said gauging line into said gauging groove, and said monitoring means comprises passage means communicating with said gauging groove.

14. The subject matter of claim 13 including:

an additional groove in said bearing surface, and passage means communicating with said additional groove through which said groove may be partially evacuated to hold said bearing member to said supporting surface.

15. The subject matter of claim 14 including:

means for regulating the bearing fluid pressure to said first distribution grooves in response to said gauging pressure to maintain a constant spacing between said surfaces.

16. A pneumatic actuator comprising:

a cylinder, a reciprocating piston in said cylinder having a cylindrical surface conforming to and spaced from the cylindrical wall surface of said cylinder and defining a chamber within said cylinder, grooves in the cylindrical surface of said piston defining a pair of circumferential end lands surrounding the ends of said piston and a pair of circumferential center lands surrounding the central region of said piston, said grooves including a first set of grooves surrounding and defining a plurality of bearing areas on the surface of the piston spaced about said piston between the end land adjacent said chamber and its adjacent center land, a circumferential groove between said center lands, a second set of grooves surrounding and defining a plurality of bearing areas on the surface of the piston spaced about said piston between the other end land and its adjacent center land, first axial grooves communicating between said chamber and said first set of grooves, and second axial grooves communicating between said center groove and the second set of grooves, and means for supplying fluid under pressure to said chamber.

17. The subject matter of claim 16 wherein:

the width of said grooves increases along said piston with their distance from said chamber.

* * * * *